United States Patent Office 3,421,980
Patented Jan. 14, 1969

---

3,421,980
PROCESS FOR THE PRODUCTION OF β-CAROTENE
Leon Ninet and Jacques Albert Renaut, Paris, and Robert Charles Francois Tissier, Maisons-Alfort, France, assignors to Rhone-Poulenc S.A., Paris, France, a French body corporate
No Drawing. Filed June 29, 1966, Ser. No. 561,405
Claims priority, application France, July 8, 1965, 23,959, 23,960, 23,961
U.S. Cl. 195—28    6 Claims
Int. Cl. C12b 1/00

---

The present invention relates to the production of β-carotene by fermentation.

β-Carotene can be obtained by the submerged fermentation of microorganisms of the Choanephora or Blakeslea type. A variety of conditions favour the production of β-carotene. Barnett et al. [Science, 123, 141 (1956)] showed that the production of β-carotene was improved by simultaneous culture of opposite (+ and −) forms of one species. It was subsequently found that the culture of opposite forms of different species also gave improved results [Hesseltine, Mycologia, 49, 449 (1957)]. It has also been found that the addition to the nutrient medium of whole or hydrolysed grain, vegetable oils, surface-active agents, antioxidants, or thickening agents increases the yield of β-carotene [Anderson et al., J. Agr. Food. Chem. 6, 543 (1958); and Ciegler et al., App. Microb. 7, 94 and 98 (1959)]. Moreover, Mackinney et al., [J. Amer. Chem. Soc. 74, 3456 (1952)] have shown that the addition of β-ionone to the static culture of a Phycomyces greatly increases the formation of β-carotene, at the expense of the formation of other carotenoid pigments. Anderson et al. (loc. cit.) observed the same effect in agitated cultures of Blakeslea and Choanephora. This promoter can be replaced by other compounds such as 2,2,6-trimethylcyclohexanone (see French patent specifications No. 1,325,656) or 2,6,6-trimethyl-1-acetylcyclohexene (see French patent specification No. 1,377,523) and valuable results obtained.

It has now been found that the production of β-carotene can be significantly improved by adding certain activators to the nutrient medium. Accordingly, the present invention provides a process for the production of β-carotene which comprises culturing aerobically the + and − forms of Blakeslea trispora in a nutrient medium containing, as activator, (a) a hydrazide of the formula:

$$\text{Het—CO—NHNH}_2 \qquad (1)$$

where Het represents a mono- or di-nuclear unsaturated heterocyclic radical, other than 4-pyridyl, in which each ring has 5 or 6 atoms and the hetero atom or atoms are oxygen, sulphur or nitrogen, and the radical may be substituted by one alkyl of up to 4 carbon atoms; (b) a pyridine of the formula:

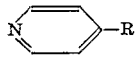

where R is alkanoyl of 1 to 4 carbon atoms, benzoyl, a said radical in which the oxo group is replaced by a functional derivative thereof, hydroxyl, hydroxyalkyl of 1 to 4 carbon atoms, carbamoyl, N-alkyl- or N,N-dialkyl-carbamoyl in which each alkyl contains up to 4 carbon atoms, thiocarbamoyl or N-alkyl or N,N-dialkyl-thiocarbamoyl in which each alkyl contains up to 4 carbon atoms; or (c) pyridazine.

The aforesaid activators may be added to the nutrient medium in amounts from 0.1 to 10 g./litre, either at the beginning or during the course of the fermentation, and either in one lot or in portions. Preferably an amount between 0.5 and 2 g./litre is used, and the activator is added at the beginning of the culture. Whatever the amount and time at which the activator is added, the culture is generally continued for 6 to 15 days after inoculation to obtain the maximum production of β-carotene. The composition of the nutrient medium may vary, but it essentially contains a source of assimilable carbon and a source of assimilable nitrogen, mineral elements, and optionally growth factors, antioxidants, surface-active agents, thickeners and β-carotene precursors.

The source of assimilable carbon may be a carbohydrate, such as glucose, a dextrin, or starch, or an animal or vegetable oil, such as lard, soya oil, or cottonseed oil. There are a large number of suitable sources of assimilable nitrogen, including pure chemical substances, and complex substances generally containing nitrogen in the form of protein, e.g. casein, lactalbumin, and gluten, and their hydrolysis products, soya flour, peanuts, yeast extracts, distillers' solubles, and corn steep. Certain of the mineral salts added can have a buffering or neutralising effect, as is the case with the alkali or alkaline earth metal phosphates.

Amongst the growth factors most frequently employed is vitamin $B_1$ or thiamine. Among the antioxidants, there may be mentioned N,N'-diphenyl-p-phenylenediamine, 2,2,4-trimethyl-6-ethoxy-1,2-dihydro-quinoline, ascorbic acid and sorbic acid. The surface-active agents are preferably of the non-ionic type, e.g. derivatives of sorbitol with fatty acids, or products based on ethylene oxide condensates. Amongst the most commonly employed thickeners are starch, carboxymethyl-cellulose and agar.

As β-carotene precursor, it is possible to employ one or more of, e.g. β-ionone, 2,2,6-trimethyl-cyclohexanone, and 2,6,6-trimethyl-1-acetyl-cyclohexene.

The culture medium is inoculated with a culture of the + and − forms of Blakeslea trispora (NRRL 2456 and 2457). The increase in the rate of production of β-carotene in the presence of the activators defined above depends on the working conditions; but the increase is nevertheless found, whether or not any antioxidant or β-carotene precursor is added to the nutrient medium.

The following examples illustrate the invention.

EXAMPLE 1

A culture medium A was prepared as follows: 500 cm.³ of water containing 75 g. of distillers' solubles were heated to boiling point in the course of 15 minutes. After cooling,

| | | |
|---|---|---|
| Starch | g | 70 |
| Soya oil | cm.³ | 40 |
| Cotton oil | cm.³ | 40 |
| Yeast extract | g | 1 |
| Monopotassium phosphate | g | 0.5 |
| Manganese sulphate monohydrate | g | 0.1 |
| Thiamine hydrochloride | g | 0.01 | were added, and the volume was made up to 1000 cm.³ with distilled water. The mixture was adjusted to pH 6.3 with a few drops of 10 N caustic soda, divided amongst 300 cm.³ Erlenmeyer flasks at the rate of 50 cm.³ per flask, and then sterilised for 20 minutes at 120° C. After sterilisation and cooling, 1 cm.³ of a sterile 2.5% solution of 2,2,4-trimethyl-6-ethoxy-1,2-dihydro-quinoline in petroleum was added to each flask under sterile conditions.

Media B and C were similarly prepared with the same constituents and in the same manner as medium A, but adding to each flask, after sterilisation of the medium, in addition to the solution of antioxidant in petroleum, the amounts given below of a 2.5% sterile solution of 2-furoyl-hydrazine in water:

| | | |
|---|---|---|
| Medium B | cm.³ | 0.2 |
| Medium C | cm.³ | 1 |

Each flask of media A, B and C was then inoculated with 5 cm.³ of a stirred culture containing the + and − forms of Blakeslea trispora (NRRL 2456 and NRRL 2457), 48 hours old. The flasks were then placed on a rotating agitator table turning at 220 r.p.m. and kept at 26° C. After 12 days culture under these conditions of agitation and temperature, the production of β-carotene was a maximum in all the flasks.

The β-carotene was determined as follows. The mycelium was filtered off, washed with water and then dried over night at 350 C. in vacuo. The dry mycelium was then extracted with hexane. The β-carotene was separated from the other carotenoids present by chromatography of the extract on alumina. The elution fractions which contain the β-carotene were combined and their strength determined spectrophotometrically by comparison with a pure sample of β-carotene. The following results were obtained:

|  | Mg./l. of β-carotene |
|---|---|
| Medium A (without adjuvant) | 1010 |
| Medium B (containing 0.1 g./l. of 2-furoyl-hydrazine) | 1150 |
| Medium C (with 0.5 g./l. of 2-furoyl-hydrazine) | 1390 |

EXAMPLE 2

Culture media A and C were prepared and inoculated as described in Example 1. After inoculation and incubation for 48 hours under the conditions described in Example 1, a solution of 50 mg. of β-ionone in 0.5 cm.³ of petroleum was added to each culture flask under sterile conditions. The cultures were then continued and finally analysed under the conditions described in Example 1. The following results were obtained:

|  | Mg./l. of β-carotene |
|---|---|
| Medium A (without adjuvant) | 1770 |
| Medium C (with 0.5 g./l. of 2-furoyl-hydrazine) | 2505 |

EXAMPLE 3

Various media were prepared, as described in Example 1 for medium C but replacing the 2-furoylhydrazine by other hydrazides of Formula 1. These hydrazides were added as aqueous solutions.

Culture medium A and the other media prepared in this manner were inoculated and left to incubate as described in Example 1. After 12 days culture, the β-carotene was detremined as described in Example 1. The results are summarised in the table below. By convention, a coefficient of 100 is allocated to the production of β-carotene in the control medium A. The coefficients allocated to the other media, containing the hydrazides of general Formula 1, give the increase in production of β-carotene compared with the control medium.

| Hydrazide added | Amount added in g./l. | Production of β-carotene |
|---|---|---|
| Nil (control medium A) |  | 100 |
| 2-furoylhydrazine (medium C) | 0.5 | 138 |
| 3-pyrazolyl-carbonyl-hydrazine | 0.5 | 143 |
| 5-methyl-2-pyrimidyl-carbonyl-hydrazine | 0.5 | 138 |
| 2-indolyl-carbonylhydrazine | 1 | 128 |
| 2-pyrazinyl-carbonylhydrazine | 1 | 127 |
| 4-thiazolyl-carbonylhydrazine | 0.5 | 113 |

EXAMPLE 4

Culture media were prepared as in Example 3 in the same way as medium C of Example 1, but replacing the 2-furoyl-hydrazine by other hydrazides of Formula 1, in aqueous solution, in the amounts indicated below. The media were inoculated at the same time as control medium A and medium C, both as described in Example 1, and the cultures were continued under the conditions described in the same example.

After two days' incubation, a sterile solution of 50 mg. of β-ionone in 0.5 cm.³ of petroleum was added to each flask. The cultures were then continued for another 10 days. The β-carotene was then determined as described in Example 1. The results are listed in the table below, using the same convention as in Example 3.

| Hydrazine added | Amount added in g./l. | Production of β-carotene |
|---|---|---|
| Nil (control medium A) |  | 100 |
| 2-furoylhydrazine (medium C) | 0.5 | 142 |
| 2-indolyl-carbonylhydrazine | 1 | 111 |
| 2-pyrazinyl carbonylhydrazine | 0.5 | 112 |

EXAMPLE 5

Medium A was prepared as described in Example 1. Media D and E were also prepared, using the same elements and working in the same manner as for medium A, but additionally adding to each flask, after sterilisation of the medium, the amounts given below of a sterile 5% solution of 4-formalpyridine in water:

| Medium D | cm.³ | 0.5 |
|---|---|---|
| Medium E | cm.³ | 1 |

Each flask of media A, D and E was then inoculated with 5 cm.³ of a stirred culture containing the + and − form of Blakeslea trispora (NRRL 2456 and NRRL 2457), 48 hours old. The flasks were then placed on a rotating agitator table turning at 220 r.p.m. at 26° C. After 12 days culture under these conditions of agitation and of temperature, the production of β-carotene was a maximum in all the flasks. The culture were then analysed as indicated in Example 1. The following results were obtained:

|  | Mg./l. of β-carotene |
|---|---|
| Medium A (without additive) | 935 |
| Medium D (with 0.5 g./l. of 4-formyl-pyridine) | 1720 |
| Medium E (with 1 g./l. of 4-formyl-pyridine) | 2050 |

EXAMPLE 6

Culture medium A was prepared as described in Example 1. Culture medium F was also prepared from the same elements and in the same manner as medium A, but adding to each flask after sterilisation of the medium, 2 cm.³ of a sterile 5% solution of 4-formylpyridine in water. The media were inoculated as described in Example 1. After inoculation and incubation for 48 hours under the conditions described in Example 1, a solution of 50 mg. of β-ionone in 0.5 cm.³ of petroleum was added to each culture flask under sterile conditions. The cultures were then continued and finally analysed under the conditions described in Example 1. The following results were obtained:

|  | Mg./l. of β-carotene |
|---|---|
| Medium A | 1770 |
| Medium F (containing 2 g./l. of 4-formyl-pyridine) | 3065 |

EXAMPLE 7

Culture medium A was prepared as in Example 1. Medium G was also prepared from the same elements and in the same manner as medium A but adding to each flask after sterilisation of the medium, 3 cm.³ of a sterile 5% solution of 4-hydroxypyridine in water. Media A and G were then inoculated as described in Example 1. After inoculation and incubation for 48 hours under the conditions described in Example 1, 50 mg. of β-ionone dissolved in 0.5 cm.³ of petroleum were added to each culture flask under sterile conditions.

Medium G was divided into two lots $G_1$ and $G_2$. 50 mg. of β-ionone dissolved in 0.5 cm.³ of petroleum were added to each flask of culture $G_1$ under sterile conditions, and 50 mg. of 2,6,6 - trimethyl - 1 - acetylcyclohexene (TMACH) dissolved in 0.5 cm.³ of petroleum were added to each flask of culture $G_2$. The cultures were then continued and finally analysed under the conditions described in Example 1. The following results were obtained:

| Culture Medium | Adjuvant | Promotor | β-carotene, in mg./l. |
|---|---|---|---|
| A | Nil | β-Ionone | 1,890 |
| G₁ | 4-hydroxypryidine, (3 g./l.). | do | 2,450 |
| G₂ | do | TMACH | 2,420 |

EXAMPLE 8

Various culture media were prepared in the same way as medium G in Example 7, but substituting for the addition of 4-hydroxypyridine the addition of other pyridine derivatives dissolved in water, in the dosages indicated below. The media prepared in this way and control medium A were inoculated and incubated as described in Example 1. After 12 days culture, the β-carotene was determined as described in Example 1. The results are summarised in the table which follows, the same convention as in Example 3 being adopted.

| Adjuvant | Amount of adjuvant added in g./l. | Production of β-carotene |
|---|---|---|
| Nil (control medium A) | | 100 |
| 4-hydroxypyridine | 3 | 189 |
| 4-thiocarbamoylpyridine | 0.5 | 180 |
| 4-hydroxymethylpyridine | 1 | 138 |
| 4-benzoylpyridine | 0.2 | 129 |
| 4-acetylpyridine | 1 | 121 |
| Thiosemicarbazone of 4-formylpyridine | 2 | 195 |

EXAMPLE 9

Culture media were prepared in the same way as in Example 8. These media were made up and inoculated as in Example 1. After 48 hours' incubation, 50 mg. of β-ionone dissolved in 0.5 cm.³ of petroleum were added under sterile conditions to each flask of the cultures. The cultures were then continued and finally analysed as described in Example 1.

The results obtained are summarised in the table below, using the same convention as in Example 3.

| Adjuvant | Amount of adjuvant added in g./l. | Production of β-carotene |
|---|---|---|
| Nil | | 100 |
| 4-hydroxypyridine | 3 | 129 |
| 4-thiocarbamoylpyridine | 0.5 | 132 |
| 4-hydroxymethylpyridine | 1 | 156 |
| 4-acetylpyridine | 0.75 | 126 |

EXAMPLE 10

Medium A was prepared as in Example 1. Medium H was also prepared with the same ingredients and in the same manner as medium A, but adding to each flask, after sterilisation of the medium, 1 cm.³ of a sterile 10% solution of pyridazine in water. Each flask of media A and H was then inoculated with 5 cm.³ of a sterred culture containing the + and — forms of *Blakeslea trispora* (NRRL 2456 and NRRL 2457), 48 hours old. The flasks were then placed on a rotating agitator table turning at 220 r.p.m. at 26° C. After 2 days' incubation, the culture flasks of medium A were divided into two lots, A₁ and A₂. The flasks of medium H were similarly divided into two lots, H₁ and H₂. 50 mg. of β-ionone dissolved in 0.5 cm.³ of petroleum were added to each flask A₂ and H₂ under sterile conditions. Flasks A₁ and H₁ had nothing added to them. The cultures A₁, A₂, H₁ and H₂ were continued for a further 10 hours under the same conditions of temperature and stirring. The production of β-carotene was then a maximum in all the flasks. The determination of the β-carotene was carried out as described in Example 1 and the following results were obtained:

| Medium | Adjuvant | Production of β-carotene in mg./l. | |
|---|---|---|---|
| | | Cultures without β-ionone | Cultures with β-ionone |
| A₁ | | 900 | |
| A₂ | | | 1,460 |
| H₁ | Pyridazine, 2 g./l. | 15,40 | |
| H₂ | do | | 2,165 |

We claim:
1. Process for the production of β-caretone which comprises culturing aerobically the + and the — forms of *Blakeslea trispora* in a nutrient medium containing, as an activator, a member selected from the group consisting of (a) a hydrazide of the formula:

Het—CO—NHNH₂ where Het represents a mono- or di-nuclear unsaturated heterocyclic radical, other than 4-pyridyl, in which each ring has 5 or 6 atoms and the hetero atom or atoms are selected from the group consisting of oxygen, sulphur and nitrogen; (b) a pyridine of the formula:

where R is a member selected from the group consisting of alkanoyl of 1 to 4 carbon atoms, benzoyl, a thiosemicarbazone thereof, hydroxyl, hydroxyalkyl of 1 to 4 carbon atoms, carbamoyl, N-alkyl or N,N-dialkyl-carbamoyl in which each alkyl contains up to 4 carbon atoms, thiocarbamoyl and N-alkyl or N,N-dialkyl-thiocarbamoyl in which each alkyl contains up to 4 carbon atoms; and (c) pyridazine.

2. Process according to claim 1 in which Het is selected from the group consisting of 2-furyl, 3-pyrazolyl, 5-methyl-2-pyrimidyl, 2-indolyl, 2-pyrazinyl, and 4-thiazolyl.

3. Process according to claim 1 in which R is selected from the group consisting of formyl, acetyl and hydroxymethyl.

4. Process according to claim 1 in which the nutrient medium contains 0.1 to 10 g. per liter of the said activator.

5. Process according to claim 4 in which the nutrient medium contains 0.5 to 2 g. per liter of the said activator.

6. Process according to claim 1 in which the fermentation is continued for 6 to 15 days after inoculation.

References Cited

UNITED STATES PATENTS 3,378,460  4/1968  Ninet et al. _____ 195—28

ALVIN E. TANENHOLTZ, *Primary Examiner.*